(No Model.)
T. E. VAN NESS.
HAME AND CLIP.
No. 324,739.  Patented Aug. 18, 1885.
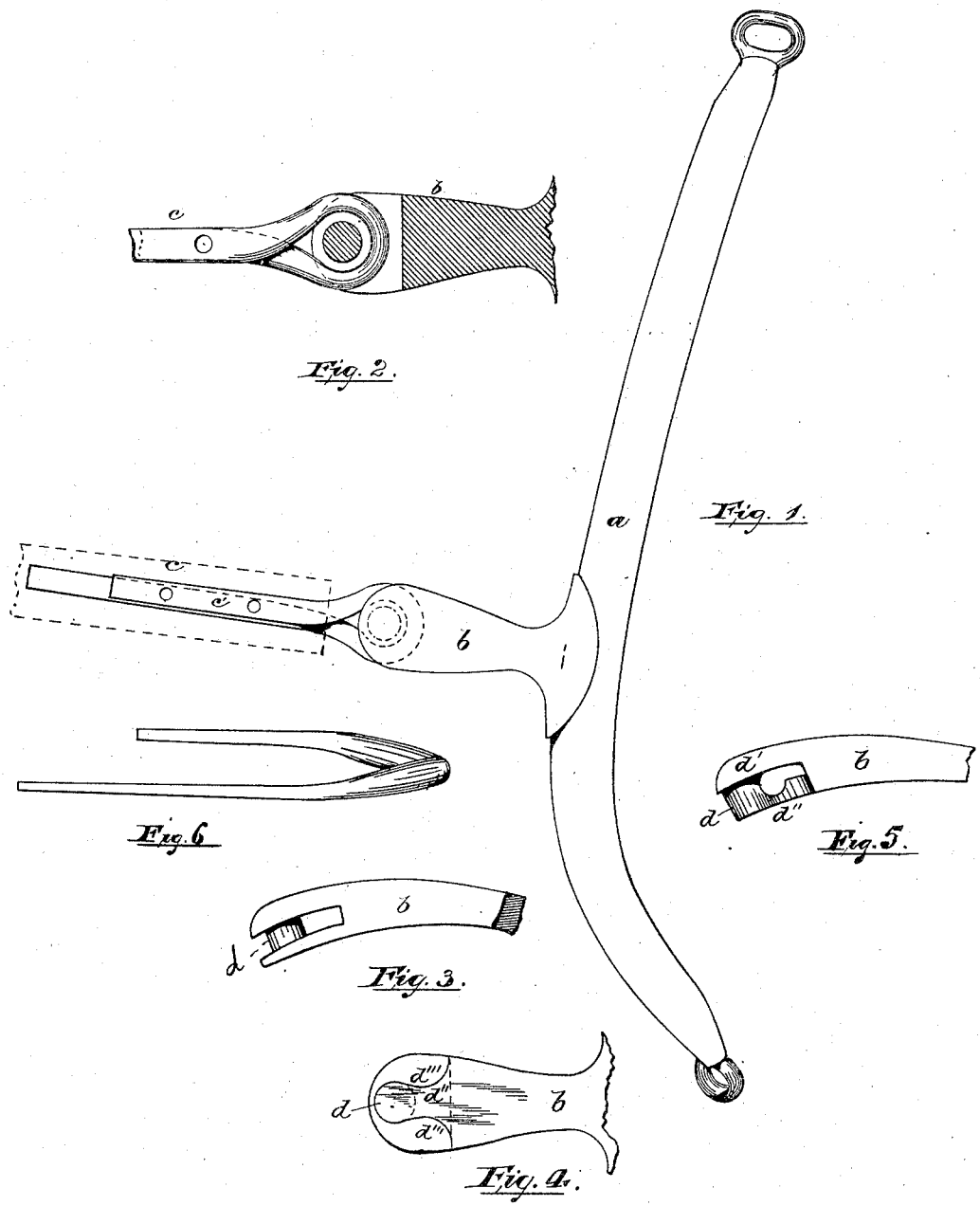

United States Patent Office.

THOMAS E. VAN NESS, OF VAILSBURG, ASSIGNOR TO THE RUBBER AND CELLULOID HARNESS TRIMMING COMPANY, OF NEWARK, NEW JERSEY.

HAME AND CLIP.

SPECIFICATION forming part of Letters Patent No. 324,739, dated August 18, 1885.

Application filed October 18, 1884. (No model.)

*To all whom it may concern:*

Be it known that I, THOMAS E. VAN NESS, a citizen of the United States, residing at Vailsburg, in the county of Essex and State of New Jersey, have invented certain new and useful Improvements in Hames and Clips; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to prevent the clip from wearing into the collar; to secure increased neatness of appearance; to secure greater freedom of movement to the clip, and to prevent the clip from wearing the plate from off the draft-eye.

The invention consists in the arrangement and combinations of parts, substantially as will be hereinafter set forth, and finally embodied in the claim.

Referring to the accompanying drawings, in which like letters of reference indicate corresponding parts in each of the several figures, Figure 1 is a side elevation of a hame, &c.; Fig. 2, a vertical section of the draft-eye; Fig. 3, an edge view of said draft-eye; Fig. 4, a back view thereof, the last said figure showing a slightly modified construction. Fig. 5 is a top view of Fig. 4, and Fig. 6 is a side view of a clip.

In said drawings, *a* represents the hame, *b* the draft-eye thereof, and *c* a clip of peculiar construction adapted to co-operate with said draft-eye. The said draft-eye is perforated in a line parallel or approximately parallel with the broad front surface thereof to receive the loop of the clip *c* and hold the same free from the collar, the perforation forming a cross-bar, *d*, and jaws *d' d''*, the first being wide and presenting the usual shape and outline to view, while the latter is narrow or about the width of the cross bar forming side recess *d'''*, which allow the clip not only the usual pivotal movement on the cross-bar, but a lateral movement or play to and from the horse. The said loop of the clip is formed to lie in a plane parallel with the plane of the tug or trace to which it is attached, or with the arms *c' c'*, so as to properly engage the draft-eye or hold the said trace or tug in a position in a plane with the broad draft-eye where employed with said draft-eye.

I am aware that in Patent No. 262,705 is shown a hame having a clip arranged between an inner and outer portion of the draft-eye, so that the outer or exposed surface of the draft-eye is not broken by unsightly protuberances or a perforation; but in this case the clip is allowed a movement in but one direction or plane, while in my device the clip is allowed a greater freedom of movement, as will be evident, whereby its value is greatly enhanced.

What I claim as new is—

The hame having a draft-eye perforated in a line or direction parallel or approximately parallel with the broad surface thereof, forming a cross-bar, *d*, and jaws *d' d''*, the latter jaw being recessed, as at *d''*, substantially as set forth and shown.

In testimony that I claim the foregoing I have hereunto set my hand this 1st day of October, 1884.

THOMAS E. VAN NESS.

Witnesses:
CHARLES H. PELL,
W. S. STARR.